(12) United States Patent
Bull et al.

(10) Patent No.: US 8,478,291 B2
(45) Date of Patent: Jul. 2, 2013

(54) LOCATION ACCURACY IMPROVEMENT USING A PRIORI PROBABILITIES

(75) Inventors: Jeffrey F. Bull, Chalfont, PA (US); Rashidus S Mia, Phoenixville, PA (US); Robert J Anderson, Phoenixville, PA (US)

(73) Assignee: TruePosition, Inc., Berwyn, PA (US)

(*) Notice: Subject to any disclaimer, the term of this patent is extended or adjusted under 35 U.S.C. 154(b) by 159 days.

(21) Appl. No.: 12/870,564

(22) Filed: Aug. 27, 2010

(65) Prior Publication Data

US 2012/0052835 A1    Mar. 1, 2012

(51) Int. Cl.
*H04W 24/00* (2009.01)

(52) U.S. Cl.
USPC ............... 455/456.1; 455/456.2; 455/456.3; 455/456.4; 455/456.5; 455/456.6

(58) Field of Classification Search
USPC .......... 455/404.2, 456.1, 456.2, 456.3, 456.4, 455/456.5, 456.6; 340/988, 989, 990, 991, 340/993; 342/451, 458; 701/400, 408, 409
See application file for complete search history.

(56) References Cited

U.S. PATENT DOCUMENTS

| | | | |
|---|---|---|---|
| 6,108,555 A | 8/2000 | Maloney et al. | |
| 6,119,013 A | 9/2000 | Maloney et al. | |
| 6,188,905 B1 | 2/2001 | Rudrapatna et al. | |
| 2004/0152471 A1* | 8/2004 | MacDonald et al. | 455/456.1 |
| 2006/0003775 A1 | 1/2006 | Bull et al. | |
| 2006/0030333 A1 | 2/2006 | Ward et al. | |
| 2007/0117572 A1 | 5/2007 | Adam et al. | |
| 2008/0160952 A1* | 7/2008 | Bull et al. | 455/404.2 |
| 2009/0285317 A1 | 11/2009 | Kim et al. | |
| 2012/0041672 A1* | 2/2012 | Curtis et al. | 701/426 |

OTHER PUBLICATIONS

International Patent Application No. PCT/US2011/048152: International Search Report and Written Opinion dated Dec. 23, 2011, 8 pages.

* cited by examiner

*Primary Examiner* — Vladimir Magloire
*Assistant Examiner* — Edd Rianne Plata
(74) *Attorney, Agent, or Firm* — Woodcock Washburn LLP

(57) ABSTRACT

A large volume of high accuracy location data is determined in many commercial wireless networks from location based services (LBS) and, in the United States, for E911. Uplink-Time-Difference-of-Arrival (UTDOA) and Assisted GPS (AGPS) are the predominant geolocation technologies providing these high accuracy locations. In the US alone over 10 million wireless subscribers are located every month because they dial the national emergency number "911" on their mobile phones. This rich set of location data provides an a priori distribution of the location of subscribers in the wireless network. All digital wireless communications networks have a mechanism for the subscribers to time synchronize their handsets to the network. This mechanism provides a band of ranges from the serving cell site to the handset. An a posteriori location estimate can be determined very quickly by considering the a priori distribution of callers in the range band that the current subscriber is in.

27 Claims, 12 Drawing Sheets

LOCATION ACCURACY IMPROVEMENT USING A PRIORI PROBABILITIES

TECHNICAL FIELD

The present invention relates generally to methods and apparatus for locating wireless devices, also called mobile stations (MS) or User Elements (UE), such as those used in analog or digital cellular systems, personal communications systems (PCS), enhanced specialized mobile radios (ES-MRs), and other types of wireless communications systems. More particularly, but not exclusively, the present invention relates to a method for improving the accuracy of a lower accuracy wireless location by the use of higher accuracy historical call information.

BACKGROUND

As described in U.S. Pat. No. 6,108,555; "Enhanced Time-Difference Localization System" and U.S. Pat. No. 6,119,013; "Enhanced Time-Difference Localization System" both by Maloney et al and owned by TruePosition Inc. and included herein via reference, use of collateral information as a factor in the calculation of a location estimate for a voice or data wireless caller can increase the accuracy of a wireless location system both for the current call and overall. Use of historical calling patterns with associated location information offers a new avenue for improving location accuracy for all location technology types.

Digital wireless cellular networks provide coverage to a geographic area by locating cell sites throughout that area. The range of a cell site's coverage is determined by the height of the transmit/receive antenna(s), the transmitter's power output, the spatial response of the antenna(s) and their orientation. Omnidirectional sites utilize antennas that transmit RF energy equally in all directions from the cell site. Sectored sites utilize antennas that transmit energy in a smaller portion of the 360 degree angular range.

Typically, sectored sites will divide the 360 degree angular range into three equiangular regions. Three antennas will be utilized with azimuthal beamwidths of 120 degrees and pointed at three uniformly spaced azimuth angles, i.e. 0 degrees, 120 degrees and 240 degrees. Sectored cell sites are utilized to increase the capacity, i.e. the number of wireless calls it can handle simultaneously, by approximately a factor of three. This sectored approach will still provide omnidirectional coverage but increased capacity over the this service area.

Wireless digital communications systems require the handset and cell site to be synchronized in time to certain accuracy. As an example, the well-known Global System for Mobility (GSM) is a time-division-multiple-access (TDMA), frequency-division-multiple-access (FDMA) digital communications system using frequency separated carriers, each carrier with eight time slots per TDM frame permitting up to eight simultaneous phone calls on a single frequency. Thus, for maximum capacity, each mobile station (MS) is assigned a time slot and must only transmit in that time slot. Each time slot is 577 microseconds in duration. GSM handsets can adjust their time of transmission in increments of 1.8 microseconds. Since radio waves propagate at a constant velocity this also corresponds to a range width, or band, of 554 meters. Thus, a GSM base station will instruct a handset to adjust their time of transmission so that it is transmitting in the correct time slot. This process of time synchronizing the handset to the base station also permits the base station to determine the range the handset is from it. In GSM networks this range value is derived from the timing advance (TA) value that the GSM network determines for each mobile so that it transmits at the correct time and duration for efficient wireless communications. In sectored cell sites this range value and sector information, i.e. in GSM the Cell Global Identity (CGI), can be used to approximate the location of mobile. This type of location estimate is commonly known as Cell Global Identity plus Timing Advance (CGI+TA). The CGI thus corresponds to a cell when omni-directional antenna is used and a sector of a cell when directional (i.e. sectored) antennas are used.

In the evolved Universal Mobile Telephony System Terrestrial Radio Access Network (eUTRAN), also known as the Long-Term-Evolution (LTE) system, as another example; the Orthogonal Frequency Division Modulation (OFDM) radio access network uses scalable radio resources for each session (voice or data). The LTE bandwidth is a divided into sets of 15 kHz subcarriers. These subcarriers grouped by 12's into 180 kHz bands. Each band is divided in time into 0.5 millisecond slots and the slots are grouped into 1.0 millisecond subframe. The 12 subcarriers bandwidth and single subframe (two 0.5 ms timeslots) are each 1 resource block (RB). With a subcarrier bandwidth of 15 KHz, the LTE symbol period is set to 66.7 microseconds. The symbol length is equal to the reciprocal of the carrier spacing so that orthogonality as required by the OFM modulation scheme is achieved.

The LTE Timing Advance ($T_{adv}$) as defined in Third Generation Partnership (3GPP) Technical Specification section 7.3, "Timing Advance". The Tadv is specified in units of (16*Ts), and the mobile must adhere to it with an accuracy of (4*Ts).

$$Ts=1/(15,000*2048) \approx 32.55 \times 10^{-9} \text{ seconds.}$$

So, $T_{adv}$ has a resolution of 520.8333 nanoseconds, and is adhered to with an accuracy of ~130.2 nanoseconds by the UE. Since radio waves propagate at a constant velocity this also corresponds to a range width, or band, of 156 meters for LTE. In LTE, the cell and sector identification (which corresponds to a geographic location) is encoded in the Physical Cell ID (PCI) rather then a unique CGI (as in GSM) for each sector of the service area.

Similar timing bands can be computed for other wireless communications systems using either timing settings or chip rates. Use of mobile transmit power can also be used as a range estimate if the transmit power is known, allowing computation of path-loss.

Wireless location technologies can be grouped as network-based or mobile-based characterized by the point of signal reception.

Network-based location solutions use specialized receivers and/or passive monitors within, or overlaid on, the wireless communications network to collect uplink (mobile device-to-base station) signaling used to determine location and velocity of the mobile device. Network-based location estimation techniques include uplink Time-Difference-of-Arrival (TDOA), Angle-Of-Arrival (AOA), Multipath Analysis (RF fingerprinting), and signal strength measurement (SSM).

Mobile-device based location solutions use specialized electronics and/or software within the mobile device to collect signaling. Location determination can take place in the device or information can be transmitted to a landside server which determines the location. Mobile Device-based location estimation techniques include CID (serving Cell-ID, e.g. the CGI for GSM and the PCI for LTE), CID+TA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. A current example of a GNSS system is the United States NavStar Global Positioning System.

Overviews of example standardized location techniques can be found in Third Generation Partnership Program (3GPP) Technical Specification 23.271, "Functional stage 2 description of LoCation Services (LCS)" (Release 10), in the Third Generation Partnership Program 2 (3GPP2) specifications C.S0022-0 and C.S0022-A, the Institute of Electrical and Electronic Engineers (IEEE) standard 802.16e-2009 Annex K, and the Open Mobile Alliance (OMA) Secure User Plane Location (SUPL V2.0) specification.

Hybrids of the network-based and mobile device-based techniques can be used to generate improved quality of services including speed, accuracy, yield, and uniformity of location. A geographic position estimate, an altitude estimate, a speed estimate and a heading can all be derived using one or more wireless location technologies as hybrids.

Since the advent of cellular telecommunications in the 1980's, and especially in the past two decades, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS/WCDMA, WiMAN, WiMAX, LTE (eUTRAN), LTE Advanced and others.

SUMMARY

The present invention uses historical high accuracy location data for past callers as a factor in the estimation of location for a current caller without additional load on the high accuracy wireless location system.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

We will now describe illustrative embodiments of the present invention. First, we provide a detailed overview of the problem and then a more detailed description of our solutions.

Using a high-accuracy wireless location system (WLS), either network-based or mobile-based, it is possible to statistically improve lower accuracy location estimation by taking into account a priori probabilities of callers locations. Use of lower accuracy location allows for more efficient use of the high accuracy location resources though use of wireless communications network (WCN) provided antenna and ranging information already in use in the WCN operations.

The location probability function that is currently computed can be thought of as the a posteriori probability of a caller's location given a range band measurement. This can be expressed in the form of Bayes Theorem as follows:

$$p(L|D) = \frac{p(D|L)p(L)}{p(D)}$$

where p(L|D) is the a posteriori probability of location given an observed range band, p(L) is the a priori probability of location, p(D) is the a priori probability of the range band, and p(D|L) is the probability of the range band, given a specific location of the caller. For a conventional approach, p(L|D) is computed directly from the high accuracy location measurements. This implicitly makes the assumption that the a priori probability of a caller's location, p(L), and the range band, p(D) are uniform. The probability of range band may be uniform, but certainly, caller locations are not uniformly distributed.

Figure 3:
FIG. 3 shows an example of the caller distribution as acquired by a wide-area wireless location system.

FIG. 3 shows the high accuracy positioning of mobile devices over a wide geographic area. Given the historical volume of high accuracy locations available, it would be possible to generate a geographically indexed database of a priori probabilities. Given a probability of location for a caller computed from the range band, the a priori probability function can be applied to it to yield the a posteriori probability of location. This will tend to "move" the location estimates towards the pre-defined higher probability caller locations. This may increase the error in some cases, but will result in a smaller average error over a large number of calls.

FIG. 1

Figure 1:
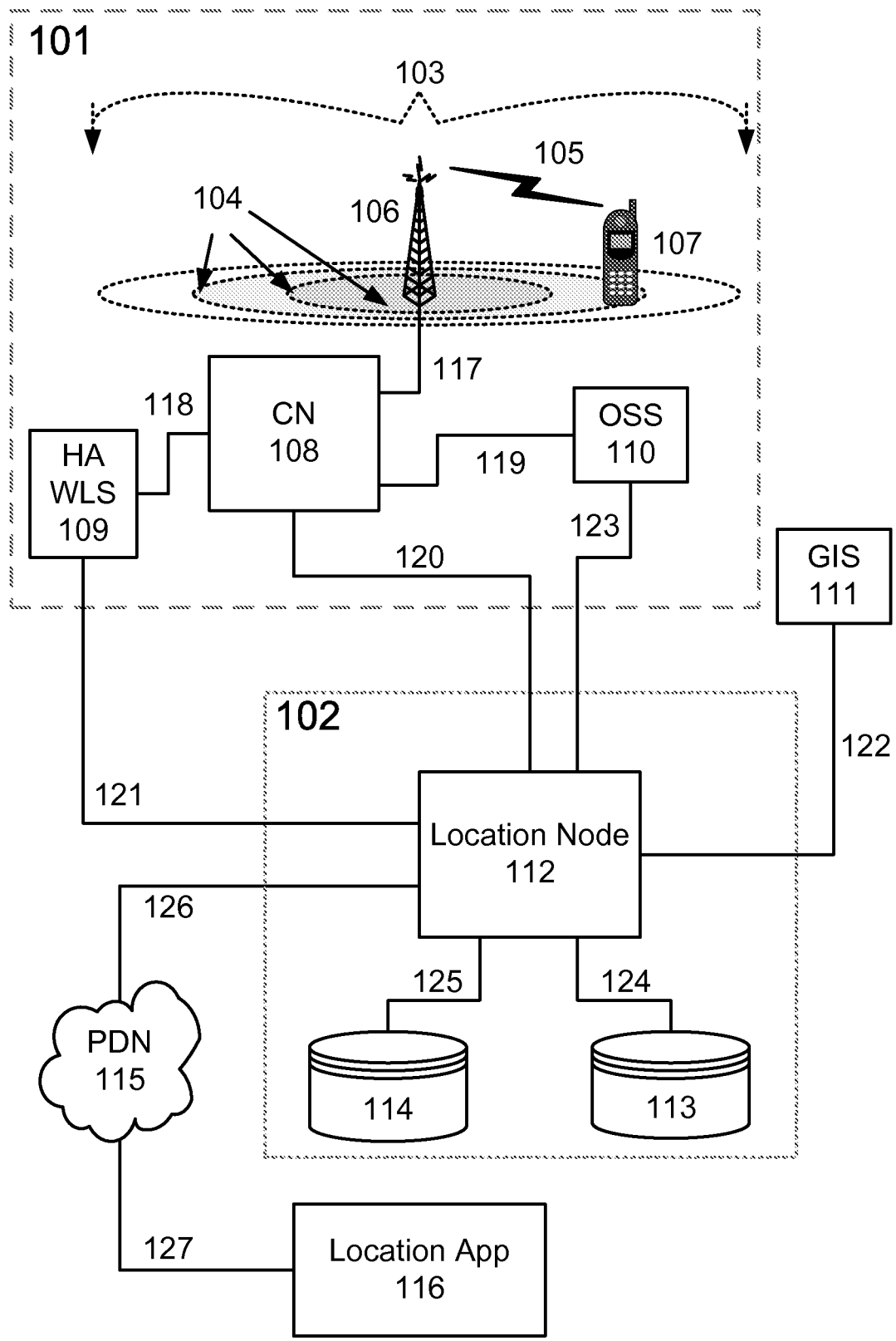
FIG. 1 schematically depicts a Wireless Communications Network augmented with the database and computational subsystems to enable the present invention.

In FIG. 1, a wireless communications network (WCN) 101 is shown in conjunction with the major subsystems making up the improved cell-ID with ranging wireless location system 102.

The WCN 101 is shown with it's ancillary or associated systems and distinct subsystems such as the Core Network (CN) 108, Radio Access Network (RAN) 103, served mobile device(s) 107, Operational Support system (OSS) 110 and high accuracy wireless location system (WLS) 109.

Also shown are the Public Data Network (PDN) 115 which is nominally a packet-switched digital network and the Location Application Server 116 which could be a Gateway Mobile Location Center (GMLC) or specialized location host for location-based services.

The local wireless communications network (WCN) 101 comprises a Radio Access Network (RAN) 103 and Core Network (CN) 108. The Radio Access Network (RAN) 103 provides radio signaling 105 between the mobile 107 and the core network (CN 108). Interconnection between the RAN 103 and the CN 108 is provided by wired or wireless backhaul 117. The CN 108 manages the mobility management and switching of calls between mobile users, and between mobile and fixed network (landline) users. Together, the RAN 103 and CN 108 make up the wireless communications network (WCN) 101 that provides the mobile device(s) 107 communications linkage with switching (circuit switched) and routing (packet switched) and various telecommunications services including location-based services.

The RAN 103 is a subsystem of the WCN 101. The RAN 103 is shown here as a single base station 106 with coverage area 104 for the purposes of clarity. The coverage area 104 is shown divided into range bands. Said range bands are based on the granularity of the timing and/or power control settings used in the RAN 103 radio signaling 105.

The mobile unit 107, also called a Mobile Station (MS) or User Equipment (UE), is a voice, data or voice/data electronic unit allowing radio communications between the mobile user and the cellular radio access network 103 via geographically distributed base station radio transceivers interconnected over wired or wireless backhaul connections 117.

The OSS 110 is a subsystem of the WCN 101 and allows the exporting of the location and radio related data, settings, and parameters. The OSS 110 is nominally connected to the CN 108 via high speed LAN or WAN digital data links 119. The GIS system 111 provides the maps and cartographic tools to map the coverage areas of the local WCN 101. The GIS 111 is generally connected to the Location Node 112 via LAN or WAN digital data links 122 dependent on the installation.

The HA WLS 109 is a mobile-based, network-based or hybrid location system that have coverage over and supplies service to the mobiles 107 within the local WCN 101. The HA WLS 109 can supply historical or near-real time extended high accuracy location records to the Location Node 112 over a generic local-area-network (LAN) or wide-area-network (WAN) digital data link 121. The HA WLS 109 may be integral or hosted on the computing platforms of the core network 108 or be distinct (as shown here), interconnected to the CN 108 (and to the MS 107 via the CN 108, RAN 103, and air interface 105 in the case of user plane, mobile-based or mobile-assisted locations) over standardized digital data connections 118 such as the E3 or E10 (ANSI/ETSI), Lb (GSM), Lup (SUPL) Iupc (UMTS), or Lpp (LTE).

The Location Server 102 is comprised of general purpose computing platform(s) and databases. The location node 112 is a general computing platform or a cluster of such platforms. The location node 112 contains within its programming and memory the algorithms and data structures (henceforth deemed "engines" or "servers") for location calculation using an improved Cell-ID Engine (Cell-ID here includes cell-ID with timing-based or and/or power-based ranging (e.g. Cell-Global-Identifier with Timing Advance (CGI+TA) for GSM, Cell ID with Round Trip Time (CI+RTT) for UMTS, Cell-Global-Identifier with Returned Signal Strength Indicator (CGI+RSSI) for GSM, Cell ID with serving-one-way-delay for CDMA, CID with Reference signal received power (RSRP) for LTE, CID with Reference Signal Received Quality (RSRQ) for LTE, CID with Rx-Tx time difference and/or cell ID (CID) with LTE Timing Advance ($T_{adv}$))

The coverage area sectional database (CASD) 113 is a relational database either internal to the location node 112 server or running on dedicated computing server with a sized storage array interconnected to the location node 112 via a high-speed digital data connection 124. Details of the local WCN 101 service area, mapping data, and RAN 103 settings and parameters are stored here.

The improved cell-id with ranging database (ICRD) 114 is a relational database either internal to the location node 112 server or running on dedicated computing server with a sized storage array interconnected to the location node 112 via a high-speed digital data connection 125. The model of the sub-sectioned coverage areas with associated call details is stored here. The database subsystems of the Location Server 102 may be preferably configured as either Storage Area Networks (SANs) or Network Attached Storage (NAS).

FIG. 2a

Figure 2A:
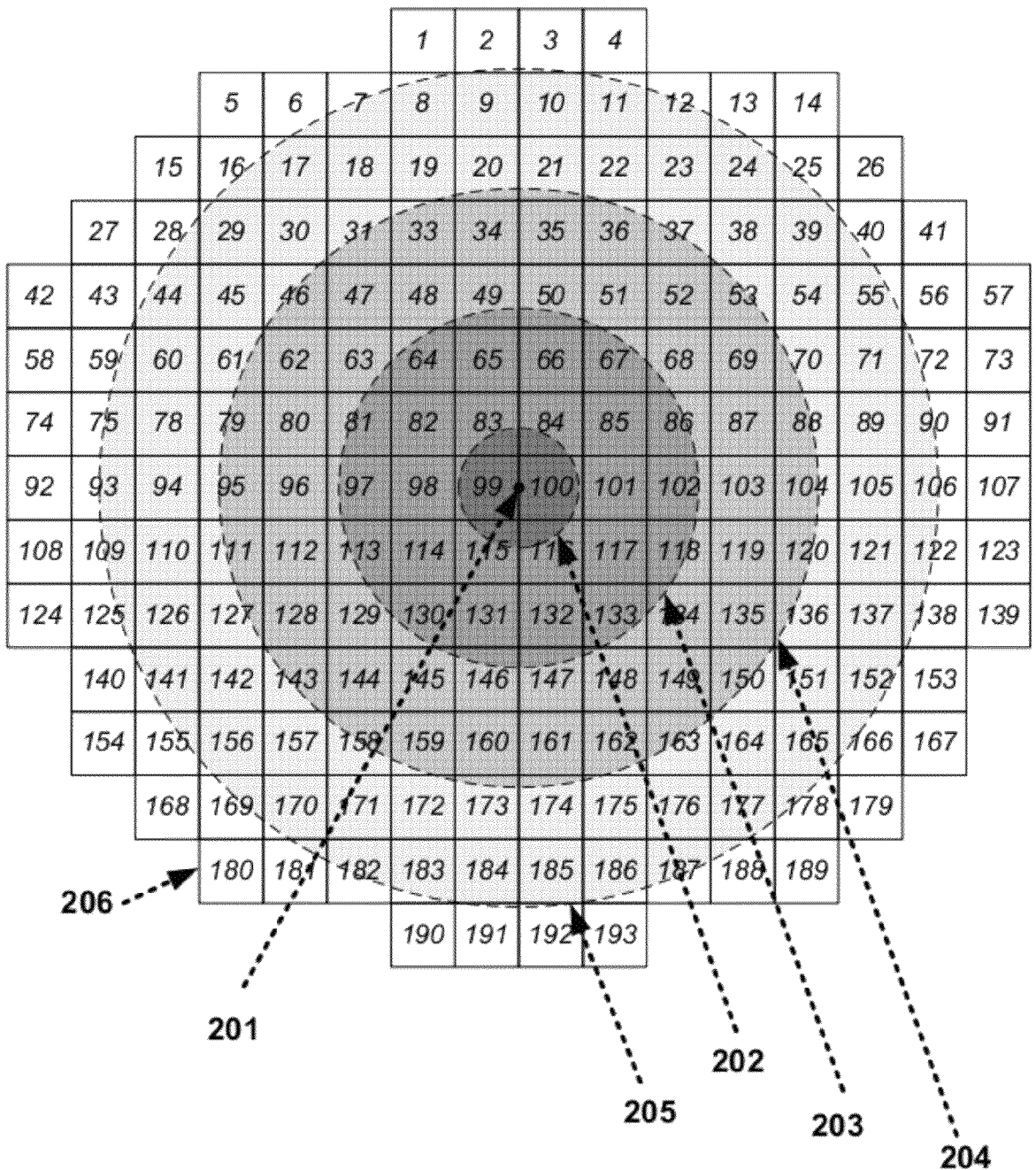
FIG. 2a depicts an illustrative model of an Omni-directional cell with idealized the range bands and use of a two-dimensional Cartesian grid to create addressable subsections of the cell.

FIG. 2a illustrates the result of sub-sectioning the coverage area (and areas of possible overlapping service) provided by an omnidirectional cell. The omnidirectional cell has a single antenna array at the center of the cell 201. In this example, 4 ranging bands 202 203 204 205 are shown. The sub-sectioning operation results in separately addressable geographic grid boxes 206. In the example shown in FIG. 2a, the sub-sectioning operation of the omnidirectional cell results in 193 separately addressable geographic grid boxes.

FIG. 2b

Figure 2B:
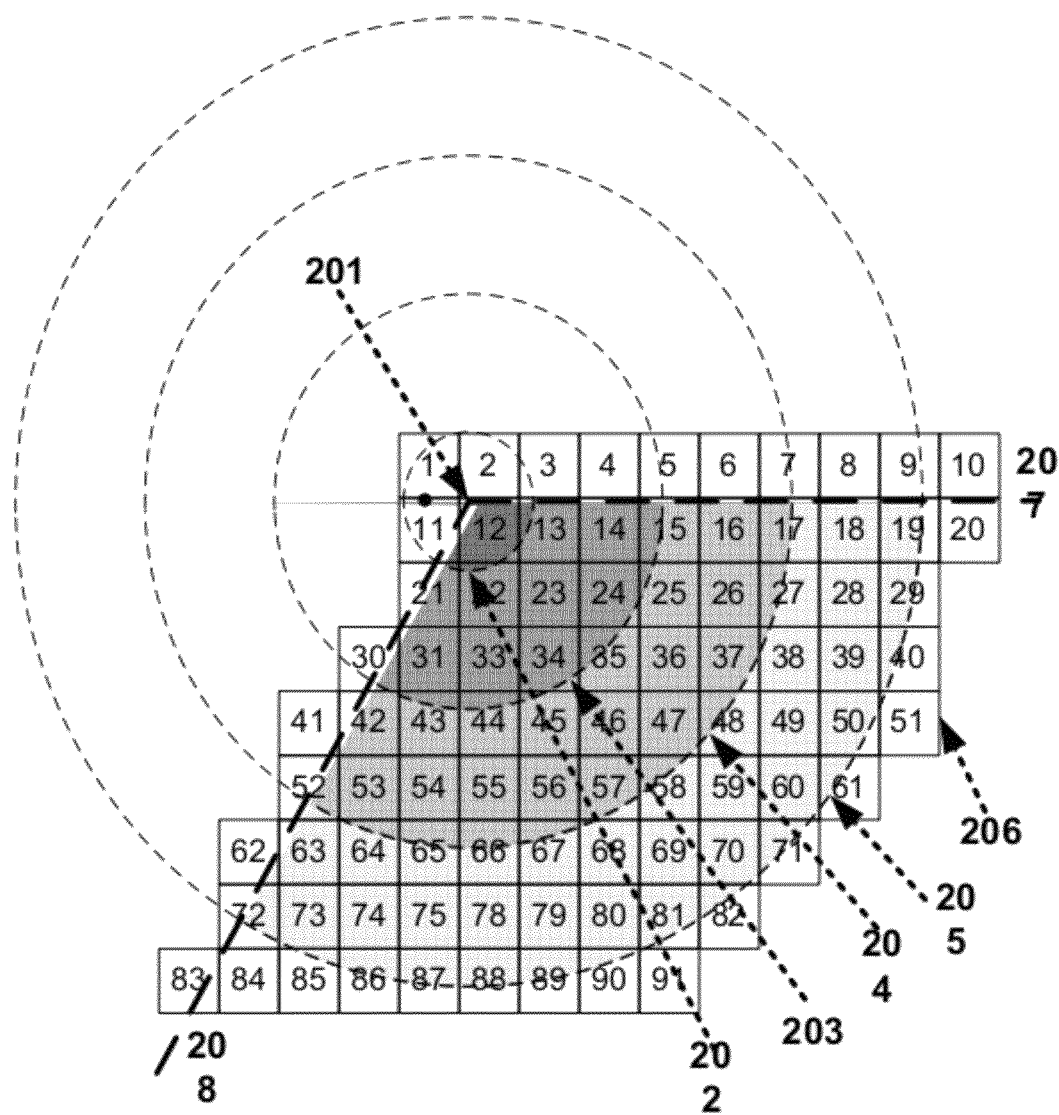
FIG. 2b depicts an illustrative model of a sectored cell with idealized the range bands and use of a two-dimensional Cartesian grid to create addressable subsections of a single sector.

FIG. 2b illustrates the result of sub-sectioning the coverage area (and areas of possible overlapping service) provided by a sector of a cell using directional antenna. The omnidirectional cell has a directional antenna at the center of the cell 201. In this example, 4 ranging bands 202 203 204 205 are shown. The sub-sectioning operation results in separately addressable geographic grid boxes 206. In the example shown in FIG. 2b, the sub-sectioning operation for the sector results in 91 separately addressable geographic grid boxes.

FIG. 3

FIG. 3 shows the location of mobile stations during mobile origination and registration events over the Philadelphia and Wilmington (U.S.A) geographic areas. This Figure shows approximately 56,000 events.

FIG. 4

Figure 4:
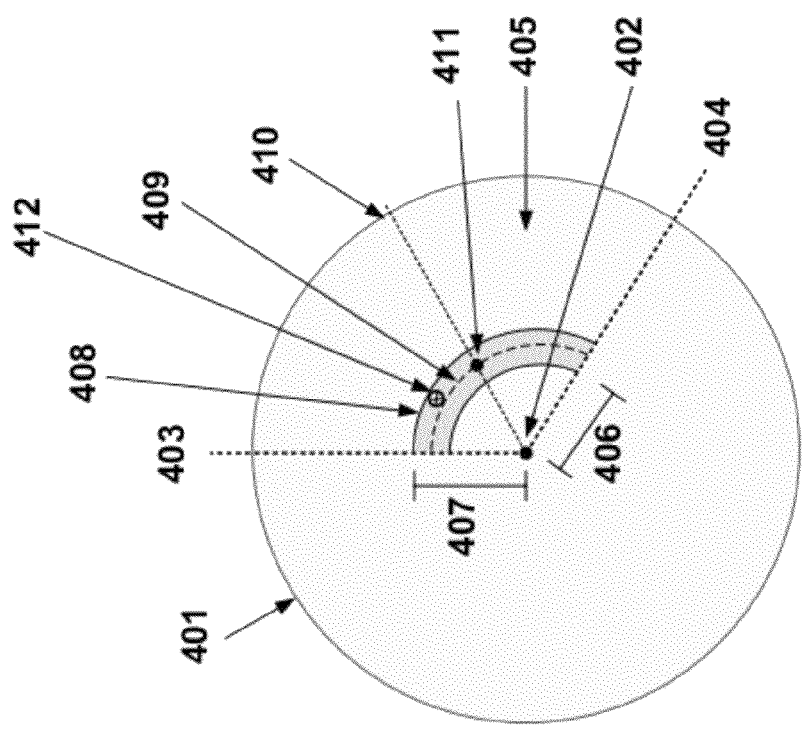
FIG. 4 schematically depicts a cell-id with range band location estimate.

Cell-based positioning methods attempt to reuse the innate timing and/or power measurements necessary for the cellular system to function. FIG. 4 illustrates the standard method (called "CGI+TA") used in the GSM system, also known as the CID+TA, CIDTA, and TA-distance location.

FIG. 4 illustrates an idealized cell ID with ranging location estimate. In this example, terminology from the GSM system is used. In this example a cell 401, equipped with directional antenna to form a sector 402 of coverage area. In GSM, both the sector and served, coverage geographic area are known by the term CGI. The cell origin 402 corresponds with the location of the base transceiver site (BTS).

The geographic position of the serving base station antenna is known 402. When a call is made, the range band 408 (as constrained by an inner range 406 and an outer range 407 and the sector edges 403 404) is developed to allow timing and power control for the mobile. Since only the range band 408 and cell site location 402 are known, a location 411 is estimated to be on an arc called the "TA-distance" 409 halfway between the inner range 406 and an outer range 407 as to be centered within the range band 408 on the sector bisector 410. The TA-distance is a range estimate between the known BTS location 402 and the unknown MS location 412.

Mathematically, the TA-distance can be described as:

TA-distance=[(TA-value+0.5)(deltaTA)]

where deltaTA=0.5[symbol period·Speed-of-Light(in air)] or $0.5(3.69 \times 10^{-6} \cdot 3 \times 10^8) = 554$ meters.

The CGI+TA model for location is idealized in that it does not take into account the multipath environment of radio operation or the real-world imperfection in antenna broadcast patterns in the generation and definition of a sectors radio coverage area. The term "call" includes mobile originations, terminations, Short-message-service, data session and control events such as paging, page response, registration, location updating, authentication, AnyTimeInterrogation (ATI), and device identity auditing.

FIG. 5

Figure 5:
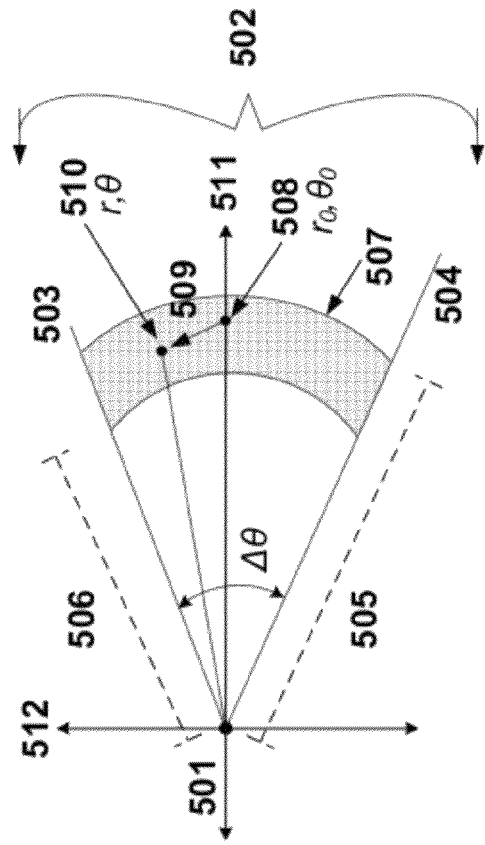
FIG. 5 schematically depicts an improved cell-id with range band location estimate.

FIG. 5 illustrates an improved cell ID with ranging location estimate. In this example a cell is equipped with directional antenna to form a sector 502 of coverage area. The X and Y coordinate system is arranged so that the X axis overlays the sector bisector 510 while the Y axis is perpendicular to the sector bisector 511 and passes thru the cell site geographical location 501.

The geographic position of the serving base station antenna is known 501. When a call is made, the range band 507 (as constrained by an inner range 506 and an outer range 505 and the sector edges 503 504) is developed to allow timing and power control for the mobile. Since only the range band 507 and cell site location 501 are known, a first location 508 is estimated to be on the sector bisector 511 midway between the inner range 506 and an outer range 505 as to be centered within the range band 507. Assuming a uniform random distribution within the range band 507, the error to any mobile within the range band 507 can be calculated. For a mobile at position (r, θ) 510 the error 509 is the distance between (r, θ) and the nominal TA-distance location for the range band $(r_o, \theta_o)$ 508.

As shown in FIG. 5, the location accuracy of a CGI+TA location estimate can be calculated mathematically. Consider a uniform distribution of subscribers in the coverage area of a GSM cell site. A subscriber is located with CGI+TA and it is desired to know the Root Mean Squared (RMS) location error of that subscriber. The location error can be determined exactly by considering a two dimensional random variable, (r, θ), as the location of the subscriber with r and θ uniformly distributed about a sector and timing advance (TA) band. The probability density function (pdf) of this random variable (rv) is simply a constant from a range of r from $r_1$ to $r_2$, typically 550 meters for GSM, and a range of θ from $-\Delta\theta/2$ to $\Delta\theta/2$, typically 120 degrees for three sector sites.

The RMS location error is a determined by first calculating the expected values of (r, θ), i.e. $(r_o, \theta_o)$, and formulating the distance squared between an arbitrary point, (r, θ), and $(r_o, \theta_o)$ in the TA band. This is the error squared. The expected value of the error squared is determined by integrating the pdf over the appropriate ranges of r and θ. The RMS is the square root of this result. However, the constant of the two dimensional pdf must first be determined. This can be determined by using a property of rv pdfs that they are equal to one when integrated over their entire two dimensional range. This is written:

$$\int_{-\Delta\theta/2}^{\Delta\theta/2} \int_{r_1}^{r_2} f_{r,\theta}(r,\theta) r\, dr\, d\theta = \int_{-\Delta\theta/2}^{\Delta\theta/2} \int_{r_1}^{r_2} K r\, dr\, d\theta = 1$$

where $f_{r,\theta}(r,\theta)$ is the two dimensional pdf and, for a uniform distribution, is equal to the constant K.

Evaluating this two dimensional integral yields the value of K as:

$$K = \frac{2}{(r_2^2 - r_1^2)\Delta\theta}$$

Next we calculate the expected value of each of the rvs. The expected value of θ can be determined as:

$$E(\theta) = \frac{2}{(r_2^2 - r_1^2)\Delta\theta} \int_{-\Delta\theta/2}^{\Delta\theta/2} \theta\, d\theta \int_{r_1}^{r_2} r\, dr$$

Evaluating this integral yields:

$E(\theta) = \theta_o = 0$

This is as expected since it is half of the angular range from the lower limit, $-\Delta\theta/2$, to the upper limit, $\Delta\theta/2$.

We will now calculate the expected value of r.

$$E(r) = \frac{2}{(r_2^2 - r_1^2)\Delta\theta} \int_{-\Delta\theta/2}^{\Delta\theta/2} \int_{r_1}^{r_2} r^2\, dr\, d\theta$$

Evaluating this integral yields:

$$E(r) = r_0 = \frac{2(r_2^3 - r_1^3)}{3(r_2^2 - r_1^2)}$$

Note that the expected value of r, $r_o$, is not at the midpoint of the timing band as might be expected but is shifted toward the outer radius. This results because of the greater area towards the outer radius $r_2$ as opposed to the inner radius $r_1$. The error squared is simply the distance from $(r_o, \theta_o)$ to an arbitrary point, (r, θ), squared as shown in the figure. This is expressed in the more familiar Cartesian coordinates as:

$error^2 = (x - x_0)^2 + (y - y_0)^2$ which can be converted to cylindrical coordinates with the conversions $x = r \cos \theta$ and $y = r \sin \theta$.

Substituting yields:

$error^2 = (r \cos \theta - r_0 \cos \theta_0)^2 + (r \sin \theta - r_0 \sin \theta_0)^2$ Substituting for $\theta_0$ equal to its expected value, i.e. zero, and rearranging via trigonometric identities yields:

$error^2 = (r \cos \theta - r_0)^2 + (r \sin \theta)^2 = r^2 - 2 r r_0 \cos \theta + r_0^2$ The expected value of the error squared, i.e., the mean of the squared error (MSE), is determined by integrating the error squared function over the two dimensional pdf of r and θ. This is written as:

$$E(error^2) = \frac{2}{(r_2^2 - r_1^2)\Delta\theta} \int_{-\Delta\theta/2}^{\Delta\theta/2} \int_{r_1}^{r_2} (r^2 - 2r_0 r\cos\theta + r_0^2) r\, dr\, d\theta$$

The RMS is determined by taking the square root of the expected value of the error squared. Evaluation of this integral yields:

$$E(error^2) = \frac{1}{2}\frac{(r_2^4 - r_1^4)}{(r_2^2 - r_1^2)} + r_0\left[r_0 - \frac{4}{3}\frac{(r_2^3 - r_1^3)}{(r_2^2 - r_1^2)}\frac{\sin(\Delta\theta/2)}{\Delta\theta/2}\right]$$

Substituting for $r_0$ and simplifying provides:

$$E(error^2) = \frac{1}{2}\frac{(r_2^4 - r_1^4)}{(r_2^2 - r_1^2)} + \frac{4}{9}\frac{(r_2^3 - r_1^3)}{(r_2^2 - r_1^2)^2}\left\{1 - 2\frac{\sin(\Delta\theta/2)}{\Delta\theta/2}\right\}$$

The RMS location error is simply the square root of the E($error^2$).

FIG. 6

Figure 6:
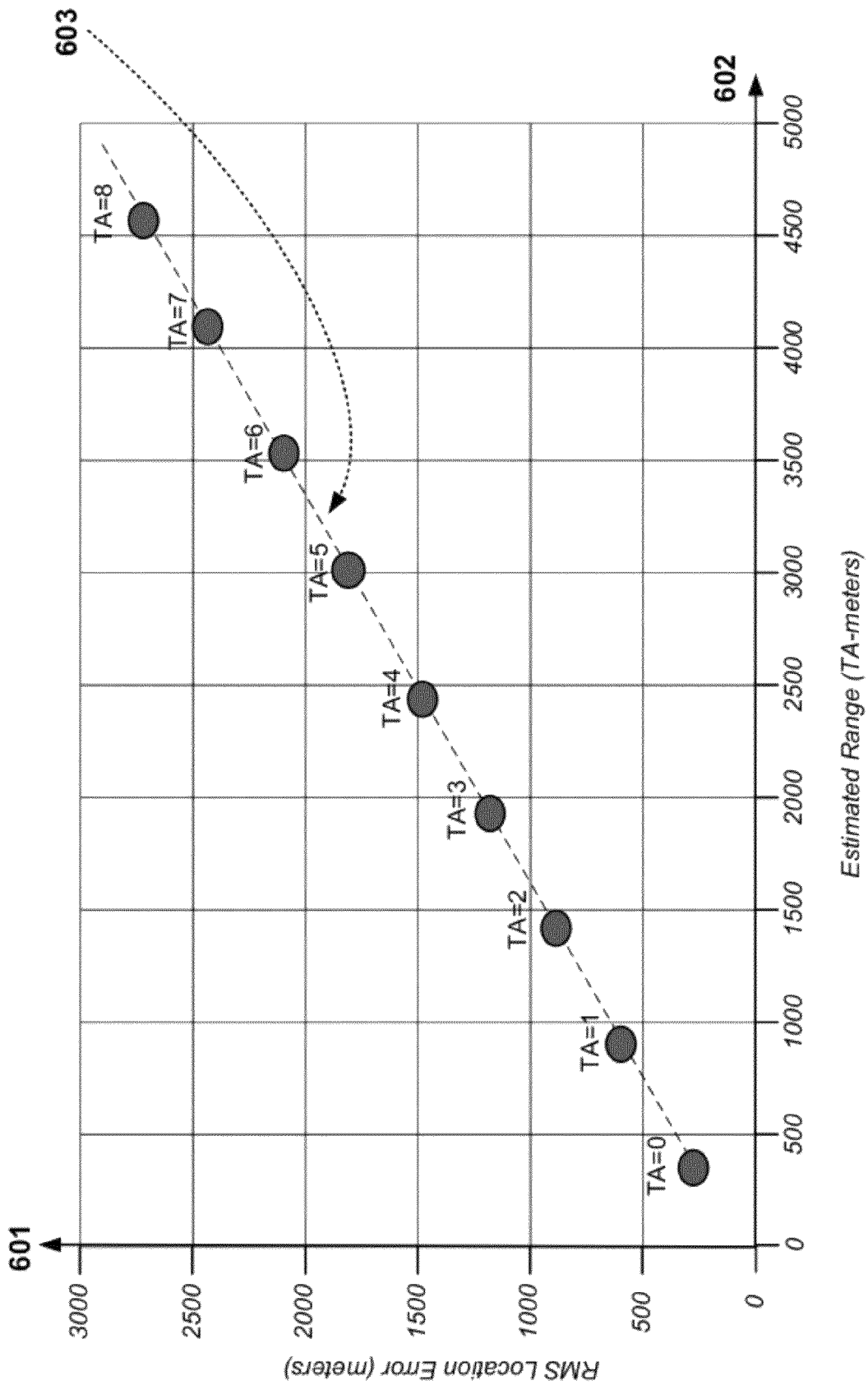
FIG. 6 shows the location error versus estimated range for a 120 degree GSM sector assuming uniform distribution of calls.

FIG. 6 shows the cell-ID location with ranging estimate error based on a uniform distribution of locations within the range band. This Figure presents a worst case scenario when using the cell-ID with ranging with historical information location technique.

In FIG. 6, the RMS location error has been evaluated for a 120 degree sector versus the estimated range over 9 GSM "TA" bands. It is assumed that the GSM network precisely assigns the TA band for this example. The TA-distance formula used in FIG. 4 is not used in this example, rather the center-of-gravity of the TA band is used as the nominal location point. Statistically, the center-of-gravity is preferable to the TA-distance calculation.

The Root-Mean-Squared (RMS) Location Error for a uniform random distribution of mobiles in the range band is shown by the Y axis 601. The X axis 602 shows the estimated range for the mobile. The RMS Location Error versus the Estimated Range is shown by plot 603.

An analysis of the plotted line 603 yields a linear function with a slope of ⅗. Thus, for every 1000 meters a subscriber is from the cell site his RMS location error will increase by 600 meters.

FIG. 7a

Figure 7A:
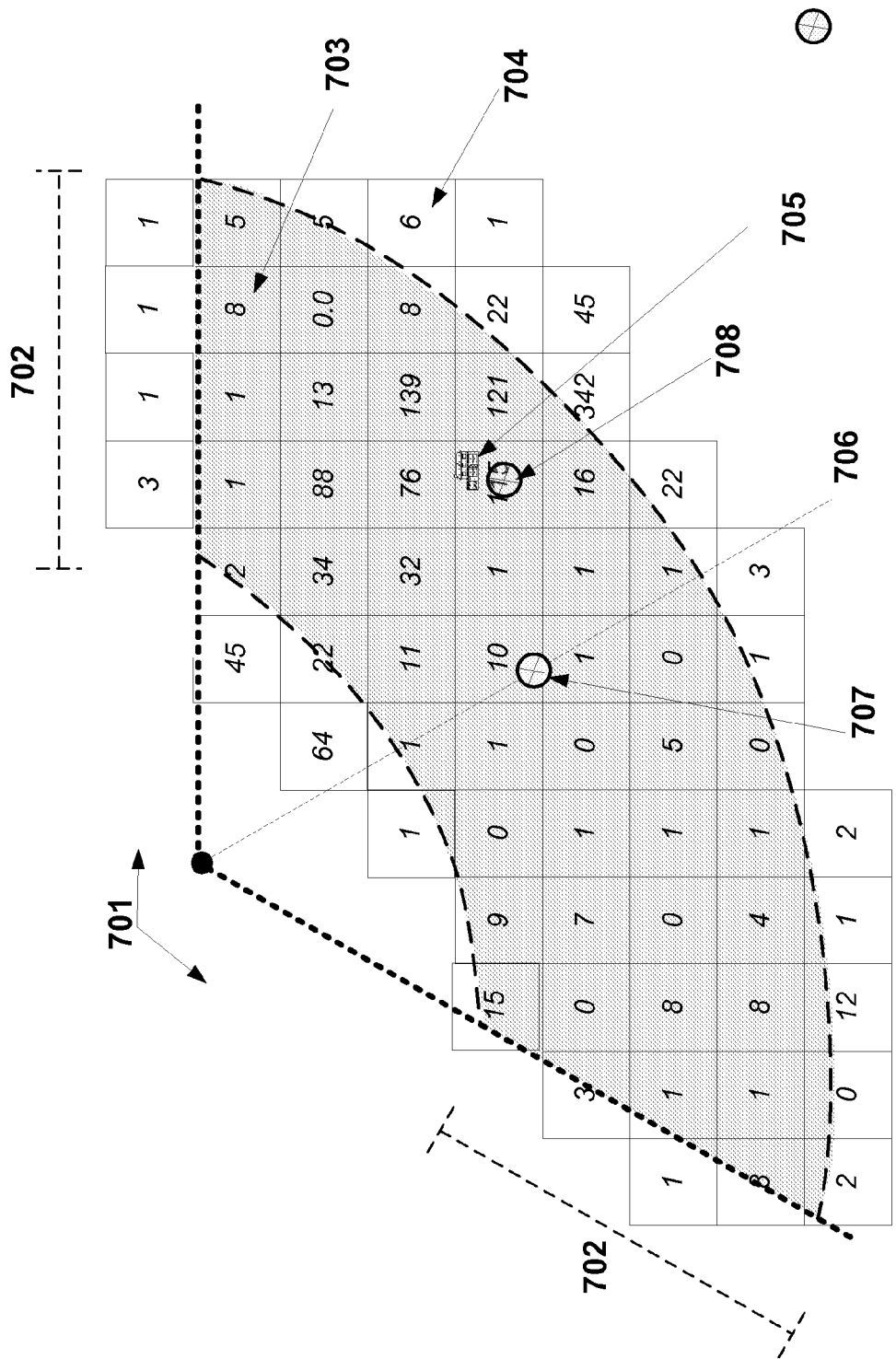
FIG. 7a geographically illustrates a range band sectioned into grid boxes with associated call counts.

The illustration in FIG. 7a geographically depicts the improved cell-ID with ranging database over a range band 702 within a sector's 701 coverage area. Each separately addressable geographic grid box has, in this example, the number of calls located with high accuracy to within that box. Grid boxes that comprise the coverage of the range band 702 are shown here with the calls located with high accuracy associated with the individual grids. Some grid boxes 703 lie totally with the nominal coverage area of the range band 702 while others 704 share some portion of the range band's 702 predicted geographic coverage.

In the FIG. 7a illustration, a building 705 sits with the range band 702. The preponderance of calls in the range band 702 is associated with the geographic area in and around the building 705. The nominal CGI+TA location 707 (as detailed in FIG. 4) plotted on the sector azimuth or bisector 706 is clearly incorrect for the vast majority of calls. By using the a priori information supplied by the historical higher accuracy mobile locations, the reported location for the range band can be reset to reduce the average location error. The improved location estimation is shown 708.

FIG. 7b

Figure 7B:
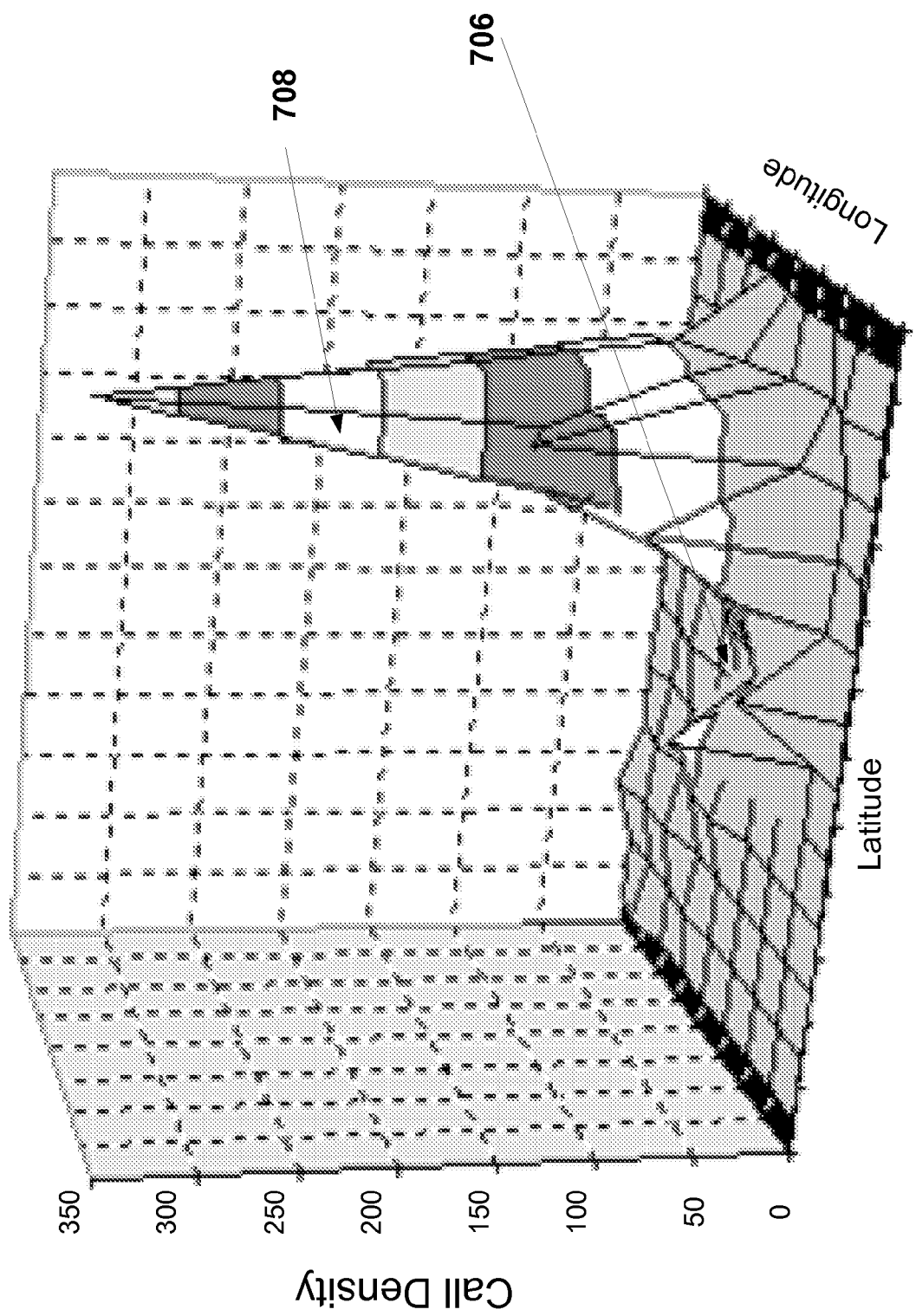
FIG. 7b depicts in 3-dimensions a range band sectioned into the geographic grid boxes with associated call counts.

The graph in FIG. 7b presents the same call count data as a 3-dimensional surface. The call data and geographic data presented here is the same as in FIG. 7a, but presented in a different fashion. The X-axis is latitude and the Y axis is longitude. The Z axis shows the call count. The improved location estimation is shown 708.

FIG. 8

Figure 8:
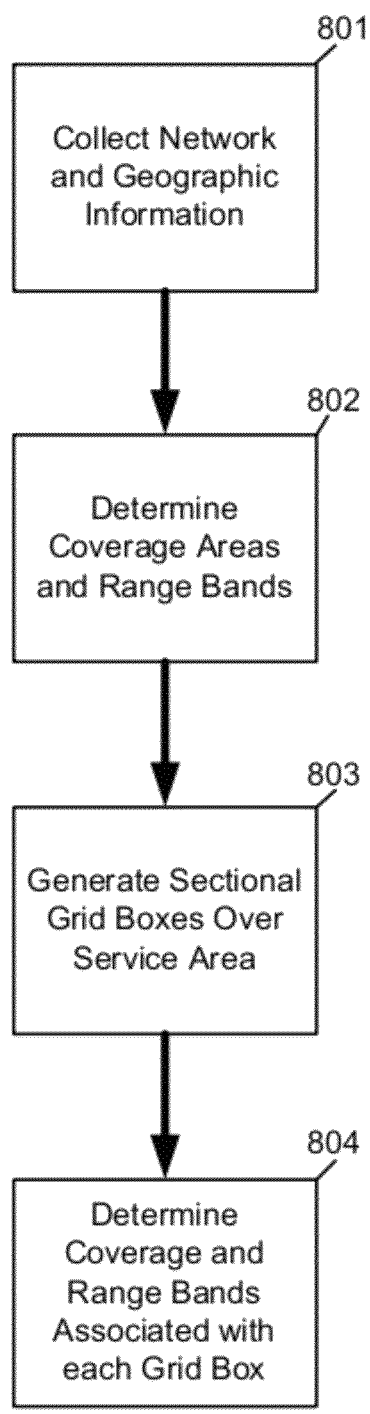
FIG. 8 graphically depicts the operational process for populating the coverage area database.

FIG. 8 illustrates the initial steps of the Improved Location Technique. A process for obtaining the wireless network settings and parameters and merging that data with geographical data is shown in FIG. 8.

First, the wireless network information and geographic information must be obtained 801. The preferred method is for collection of wireless network settings and parameters is via electronic transfer from the Operational Support System (OSS) that manages the provisioning and inventory databases for the wireless communications network. Geographic information is obtained from a Geographic Information System (GIS). The GIS system may be part of the operators WCN but can be from a third party. Both the OSS and GIS information is periodically updated or ad hoc when large network or geographic events occur (addition of cell towers, road openings, closings, flooding, etc).

The collected WCN information can include:
Location of the cell sites
Identifier for each cell site
Number of sectors at each site
Identifier for each sector
Orientation of each sector
Angular range of each sector
Maximum range of each sector
Radial width of each range band
Wireless Communication Network Identifier of each range band In the cases where power-based ranging is used, power level contours will be constructed and numbered to form the required range bands.

Next the nominal geographic coverage areas of the ranging bands are determined from the wireless network information 802.

Then the coverage areas are sectioned and separately addressable, geographical grid boxes are formed over the service area 803. The size of the grid boxes are selected to be consistent with the accuracy of the highest accuracy location technique providing the a priori location estimates. The location, i.e. latitude and longitude, of the center of each grid box is noted. Thus, each grid box possesses an identifying number and a location.

Finally, using the coverage areas and ranging bands previously generated, and initial association of grid boxes with coverage areas and ranging bands is created 804.

FIG. 9

Figure 9:
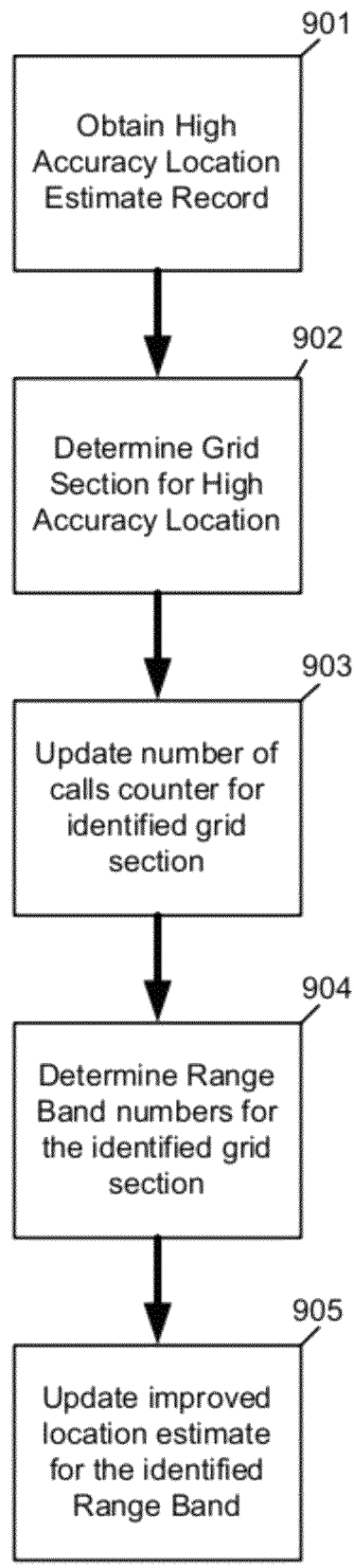
FIG. 9 graphically depicts the operational process for populating the improved cell-id with ranging database.

A process populating the improved cell-ID with ranging database is shown in FIG. 9.

First, high accuracy location estimates for calls placed within the coverage areas is obtained 901. The historical information records may be obtained all-at-once as a data dump or piecemeal over a provisioning period. Continuous or periodic delivery of new historical information records can be used to further update the improved cell-ID with ranging database. The map shown on FIG. 3 depicts high accuracy locations as dots and is an example of the volume of high accuracy location estimates that can be collected over a time period.

Once a high volume of high accuracy location estimates for the coverage area is collected, each a priori high accuracy location is associated with a grid box 902. A location counter is associated with each grid box and is updated 903. Then the range band(s) associated with the updated grid box is identified 904. Finally, the a posteriori, i.e. improved, location estimate for the range band(s) is updated 905.

The improved location estimate for each range band is calculated by multiplying the latitude and longitude of each grid box by the number of locations in each grid box and summing these results for all of the grid boxes in the range band. Finally, the results are divided by the summation of the number of location in all of the grid boxes in the range band. Mathematically, for a range band associated with N grid boxes this is written as:

$$improvedlatitude = \frac{\sum_{i=1}^{N} latitude_i M_i}{\sum_{i=1}^{N} M_i},$$

$$improvedlongitude = \frac{\sum_{i=1}^{N} longitude_i M_i}{\sum_{i=1}^{N} M_i}$$

where i indicates the grid box index, latitude$_i$ is the latitude of the center of the i$^{th}$ grid box, longitude$_i$ is the longitude of the center of the i$^{th}$ grid box and M$_i$ is the number of high accuracy locations in the i$^{th}$ grid box. Similarly, the location error and error ellipse can be calculated for each range band.

Default Improved Locations

The improved location technique can be initialized before high accuracy locations are available by setting the count equal to zero in each grid box associated with every range band over the WCN coverage area. If an improved location is requested for a specific cell sector and range band before any high accuracy location estimates have been obtained for this specific cell sector and range band then it will have a count of zero for all of the grid boxes. The default improved location will be determined by summing the latitudes and longitudes for all of the grid boxes and dividing by the total number of grid boxes. Mathematically, the default improved location estimate for a range band associated with N grid boxes is written as:

$$defaultimprovedlatitude = \frac{\sum_{i=1}^{N} latitude_i}{N},$$

$$defaultimprovedlongitude = \frac{\sum_{i=1}^{N} longitude_i}{N}$$

This will provide a location estimate assuming a uniform distribution of subscribers about the range band.

FIG. 10

Figure 10:
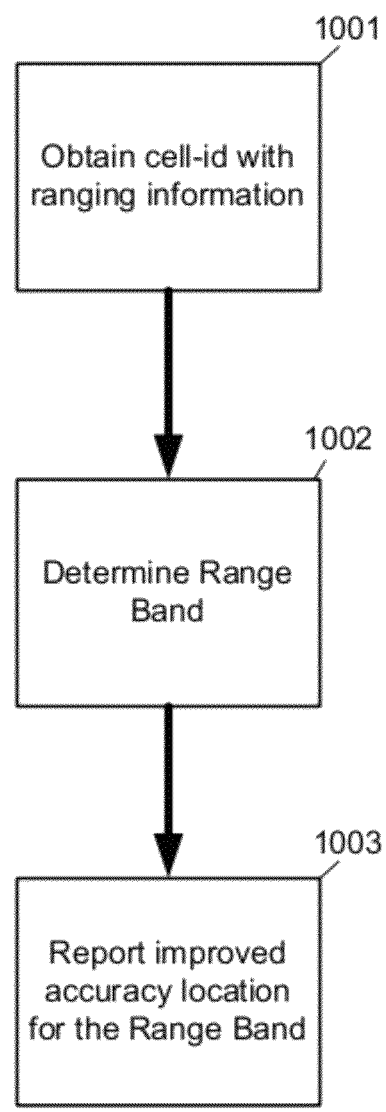
FIG. 10 graphically depicts the operational process for determining an improved cell-id with ranging location estimate.

FIG. 10 depicts a process for determining an improved cell-id with ranging location estimate using the wireless call information and the improved cell-ID with ranging database generated from the historical extended call location information records.

During a call (voice call, messaging service, or data session), the cell-ID and ranging information are obtained from the WCN 1001. This ranging information may be power or time based. The ranging information is used to determine the range band and the improved cell-ID location with ranging estimate for that range band will be determined 1002. This improved cell-ID location with ranging estimate will then be reported to the location application server 1003.

Additional Embodiments

If high accuracy location data is available for every cell sector and range band of the WCN then the technique can be implemented without information about the WCN. This is accomplished by gridding the entire coverage area. Each grid box of the grid is assigned an identifier and a latitude and longitude associated with its center. Each high accuracy location record will possess a latitude and longitude and a cell sector identifier and range band. Each grid box will have a counter associated with each cell sector identifier/range band of high accuracy locations that are in the latitude and longitude range of the grid box. Thus, some grid boxes will have no counters if no high accuracy locations occur at the grid box's location. Similarly, some grid boxes will have more than one counter because it overlaps range bands and/or cell sectors due to wireless propagation phenomena such as multipath reflections, refraction, etc. The improved location estimate will be calculated by considering only those grid boxes associated with the specific cell sector/range band of the improved location request and only the counter of those grid boxes associated with the specific cell sector/range band.

Using Extended High Accuracy Location Records to Adjust Range Bands

Figure 11:
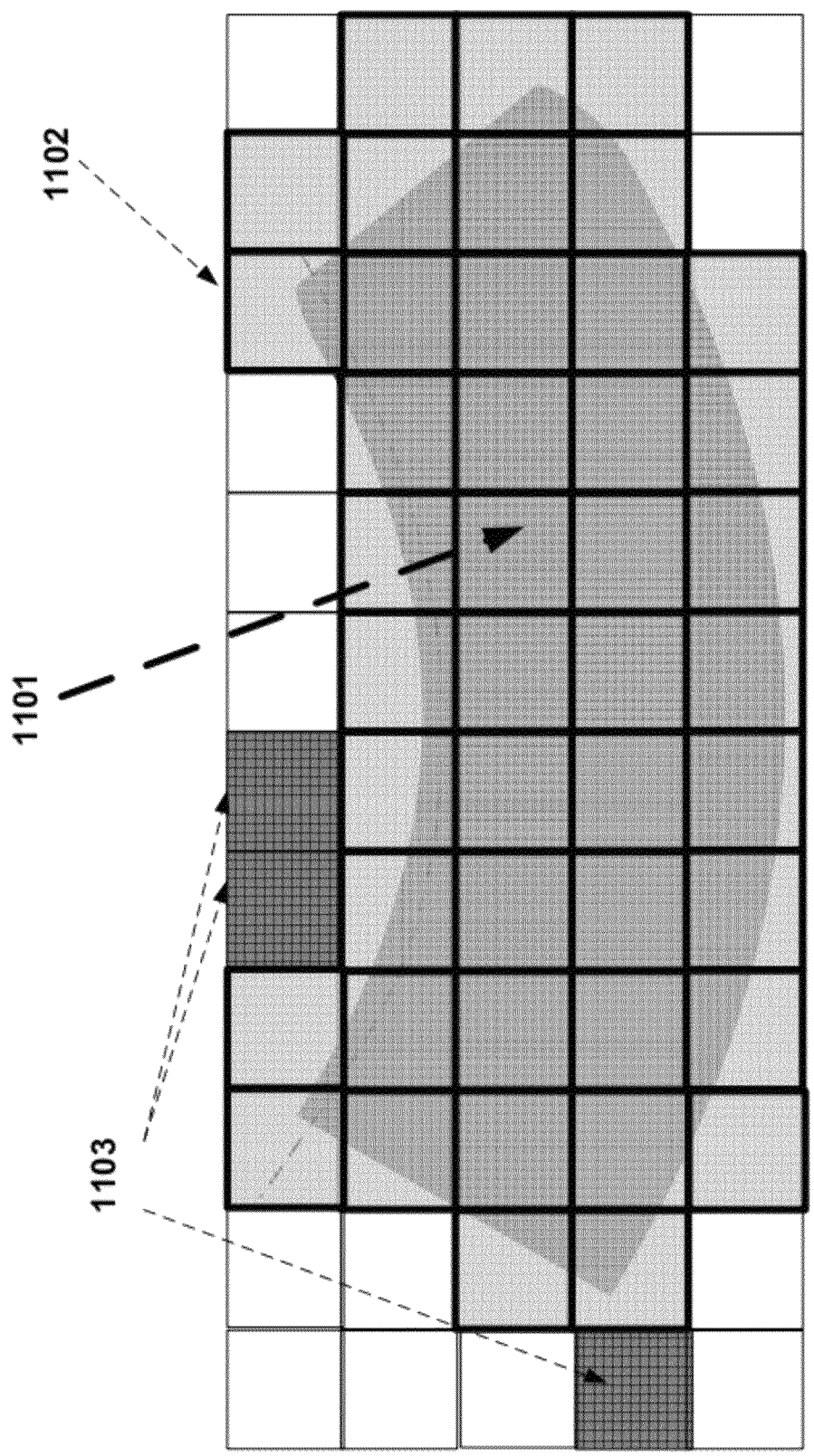
FIG. 11 graphically depicts the re-contouring of the range bands based on extended location records.

If the cell idea and range data is available in the location record for historical high-accuracy locations, then the range bands may be adjusted using this data. As shown in FIG. 11, a range band (in this example, a sectored range band) 1101 is overlaid with the geographical grid sectioning based on the nominal or predicted range band. The nominal grid boxes 1102 are those coincident on the modeled geographical area of the range band 1101. From analysis of extended high accuracy location records, it becomes apparent that high accuracy locations also report as being in the range band 1101 despite being outside the nominal coverage area of the range band 1101. The geographic grid boxes 1103 that would contain the high accuracy locations are then added to the re-contoured range band.

This type of adaptive range banding is expected to increase the accuracy of the improved cell-id with ranging location estimate. Due to antenna delay, multipath reflections and refraction of the radio waves, actual geographic coverage of a range band may not match the predicted coverage. This automatic adjustment using extended high-accuracy location records Using Time-of-Day and Date Adjustments As the improved cell-id with ranging database (ICRD) increases in size with the addition of more high accuracy location records, calling patterns may be observed, for instance; the call distribution in a range band coverage area may change based on the time of day, on the day-of-the-week, with seasonality or time of year. Use of the time and date stamp included in the high accuracy location records allows for use of the observed call distribution over time to further increase the accuracy of an improved cell-id with ranging location estimate.

Additional Call-Related Information

If the high accuracy location record includes the called/calling number or a service identifier (e.g. the teleservices identifier), the additional call-related information can be included in the creation of the distribution factor for a particular called number or service type within the ICRD database. For example, emergency services calls (e.g. 9-1-1, 1-1-2, 9-9-9) may have a markedly different distribution factor from other voice calls or data sessions. Indexing of the improved cell-id with ranging database (ICRD) with the calling/called number or services identifier allows for separate distribution factors to be computed for each service or number, resulting in highest accuracy for the particular service or call.

CONCLUSION

The true scope the present invention is not limited to the presently preferred embodiments disclosed herein. For example, the foregoing disclosure of illustrative embodiments of a wireless location system and associated wireless communications system uses explanatory terms, such as LMU, WLS, Timing Advance (TA), and the like, that refer to structures, protocols and technical standards which represent exemplary, and in some cases presently preferred, implementations of the inventive concepts described herein, but these are by no means intended to limit the invention. Accordingly, except as they may be expressly so limited, the scope of protection of the following claims is not intended to be limited to the specific embodiments described above.

What is claimed:

1. A cell identification with ranging wireless location method for determining a subscriber handset location estimate, wherein the method is for use in association with a wireless communications network (WCN) and wherein the location method employs a predetermined distribution of high accuracy subscriber handset location estimates, comprising:
   defining a grid overlaying the coverage area of the WCN, wherein the grid includes a plurality of grid boxes each of which corresponds to a respective geographic area;
   associating with each box of the grid a number representing a count of historical high accuracy subscriber handset locations corresponding to the geographic area associated with that grid box;
   determining an improved nominal location for each of a plurality of range bands in the WCN, wherein the improved nominal location associated with each range band is based on the count of historical high accuracy subscriber handset locations associated with the grid boxes corresponding to the range band;
   identifying, for a subscriber handset to be located, a specific range band corresponding to a range value and a cell sector identifier; and
   providing an improved accuracy location estimate based on the improved nominal location corresponding to the identified specific range band.

2. A method as recited in claim 1, wherein said range value is based on a timing advance (TA) value.

3. A method as recited in claim 2, wherein the WCN includes a mechanism for subscriber handsets to time synchronize to the WCN and to determine a range band based on a timing advance (TA) value and a cell global identifier (CGI).

4. A method as recited in claim 1, wherein said range value is based on a power measurement.

5. A method as recited in claim 1, wherein the identity of the specific range band is based on network-based timing or power measurements.

6. A method as recited in claim 1, wherein the identity of the specific range band is based on handset-based timing or power measurements.

7. A method as recited in claim 1, further comprising updating at least one number associated with a box of the grid as new high accuracy subscriber handset location data are provided.

8. A method as recited in claim 1, wherein configuration information about the configuration of the WCN is utilized to determine the improved nominal location for each of the plurality of range bands.

9. A method as recited in claim 8, wherein said configuration information comprises at least one of the following: cell site location information, sector type information, sector orientation information, sector antenna beamwidth information, and sector identification information.

10. A method as recited in claim 1, wherein said grid boxes have a resolution consistent with that of a high accuracy geolocation system.

11. A method as recited in claim 1, wherein the WCN includes a database populated with high accuracy location data from location based services (LBS) and emergency services.

12. A method as recited in claim 11, wherein the high accuracy location data is pre-determined using uplink-time-difference-of-arrival (UTDOA) and assisted GPS (AGPS) geolocation technologies.

13. A method as recited in claim 1, wherein a location node associated with the WCN is configured for location calculation using an improved cell-ID engine for performing cell-ID with timing-based and/or power-based ranging with historical, high accuracy location data.

14. A method as recited in claim 13, wherein the cell-ID with timing-based and/or power-based ranging includes at least one of: Cell-Global-Identifier with Timing Advance (CGI+TA), Cell Identifier with Round Trip Time (CI+RTT), Cell-Global-Identifier with Received Signal Strength Indicator (CGI+RSSI), Cell Identity with Reference Signal Received Quality (RSRQ), Physical Cell ID with LTE Timing Advance (PCI+Tadv).

15. A method as recited in claim 13, wherein the location node is coupled to or includes a coverage area sectional database (CASD) comprising data concerning the WCN's service area, mapping data, and radio access network (RAN) settings and parameters.

16. A method as recited in claim 13, wherein the location node is coupled to or includes an improved cell-ID with ranging database (ICRD) comprising a model of at least one sub-sectioned coverage area with associated call details.

17. A method as recited in claim 16, wherein the model of the sub-sectioned coverage area includes a plurality of range bands and separately addressable geographic grid boxes.

18. A method as recited in claim 16, comprising a process for populating the improved cell-ID with ranging database, said process comprising:
   obtaining high accuracy location estimates for calls placed within one or more coverage areas; and
   associating each a priori high accuracy location estimate with a grid box, wherein a location counter is associated with each grid box and is updated and one or more range bands associated with the updated grid box are identified and an a posteriori, improved location estimate for the range band(s) is updated.

19. A method as recited in claim 18, further comprising using extended high accuracy location records to adjust one or more range bands.

20. A method as recited in claim 18, further comprising using time and date information associated with high accuracy location records to improve the accuracy of a cell-id with ranging location estimate.

21. A method as recited in claim 18, further comprising indexing of the ICRD with calling/called number information or services identifier information.

22. A method as recited in claim 16, comprising populating the ICRD at start-up with recorded high accuracy extended location records without need for prior range band mapping.

23. A method as recited in claim 16, comprising populating the ICRD over time using high accuracy extended location records without need for prior range band mapping.

24. A method as recited in claim 1, comprising a process for obtaining data concerning WCN settings and parameters and merging that data with geographical data, said process comprising:
- obtaining WCN information and geographic information via electronic transfer from an Operational Support System (OSS) that manages provisioning and inventory databases for the WCN, and obtaining geographic information from a Geographic Information System (GIS), wherein the collected WCN information includes at least one of the following: location of cell sites, identifier for each cell site, number of sectors at each cell site, identifier for each sector, orientation of each sector, angular range of each sector, maximum range of each sector, radial width of each range band, and WCN identifier of each range each band;
- determining nominal geographic coverage areas of each range band;
- sectioning the coverage areas and forming separately addressable, geographical grid boxes corresponding to the service area, wherein the size of the grid boxes is selected to be consistent with the accuracy of the highest accuracy location technique providing a priori location estimates, and wherein coordinates of the center of each grid box are recorded such that each grid box possesses an identifying number and location; and
- using the coverage areas and range bands, creating an initial association of grid boxes with coverage areas and range bands.

25. A method as recited in claim 24, further comprising constructing and numbering power level contours to form range bands for power-based range measurements.

26. A non-transitory computer readable medium comprising instructions that, when executed by a processor, cause the processor to carry out a cell identification with ranging wireless location method, wherein the method comprises:
- defining a grid overlaying the coverage area of a wireless communication network (WCN), wherein the grid includes a plurality of grid boxes each of which corresponds to a respective geographic area;
- associating with each box of the grid a number representing a count of historical high accuracy subscriber handset locations corresponding to the geographic area associated with that grid box;
- determining an improved nominal location for each of a plurality of range bands in the WCN, wherein the improved nominal location associated with each range band is based on the count of historical high accuracy subscriber handset locations associated with the grid boxes corresponding to the range band;
- identifying, for a subscriber handset to be located, a specific range band corresponding to a range value and a cell sector identifier; and
- providing an improved accuracy location estimate based on the improved nominal location corresponding to the identified specific range band.

27. A cell identification with ranging wireless location system for determining a subscriber handset location estimate, wherein the system is for use in association with a wireless communications network (WCN), comprising:
- means for defining a grid overlaying the coverage area of the WCN, wherein the grid includes a plurality of grid boxes each of which corresponds to a respective geographic area;
- means for associating with each box of the grid a number representing a count of historical high accuracy subscriber handset locations corresponding to the geographic area associated with that grid box;
- means for determining an improved nominal location for each of a plurality of range bands in the WCN, wherein the improved nominal location associated with each range band is based on the count of historical high accuracy subscriber handset locations associated with the grid boxes corresponding to the range band;
- means for identifying, for a subscriber handset to be located, a specific range band corresponding to a range value and a cell sector identifier; and
- means for providing an improved accuracy location estimate based on the improved nominal location corresponding to the identified specific range band.

* * * * *